US009677467B2

(12) United States Patent
Achiwa et al.

(10) Patent No.: US 9,677,467 B2
(45) Date of Patent: Jun. 13, 2017

(54) VERTICAL ENGINE

(71) Applicant: SUZUKI MOTOR CORPORATION, Hamamatsu-shi, Shizuoka (JP)

(72) Inventors: Tetsushi Achiwa, Hamamatsu (JP); Keisuke Daikoku, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 19 days.

(21) Appl. No.: 14/787,975

(22) PCT Filed: Apr. 24, 2015

(86) PCT No.: PCT/JP2015/062466
§ 371 (c)(1),
(2) Date: Oct. 29, 2015

(87) PCT Pub. No.: WO2015/174245
PCT Pub. Date: Nov. 19, 2015

(65) Prior Publication Data
US 2016/0356215 A1 Dec. 8, 2016

(30) Foreign Application Priority Data

May 13, 2014 (JP) .................................. 2014-099401
May 13, 2014 (JP) .................................. 2014-099610

(51) Int. Cl.
*F02B 75/00* (2006.01)
*F02M 35/116* (2006.01)
(Continued)

(52) U.S. Cl.
CPC ............ *F02B 75/007* (2013.01); *F02B 23/08* (2013.01); *F02B 61/045* (2013.01); *F02B 75/22* (2013.01);
(Continued)

(58) Field of Classification Search
CPC .... F02M 61/14; F02M 69/495; F02M 69/049; F02M 69/044; F02M 69/045
(Continued)

(56) References Cited

U.S. PATENT DOCUMENTS 5,636,613 A * 6/1997 Aoyama ............... F02B 31/087
123/432
6,321,720 B1 * 11/2001 Kashima ............... F02B 61/045
123/184.31
(Continued)

FOREIGN PATENT DOCUMENTS

JP        2007-309121 A    11/2007

*Primary Examiner* — Thomas Moulis
(74) *Attorney, Agent, or Firm* — Stein IP, LLC

(57) ABSTRACT

Even in the case where a crankshaft extends in a substantially vertical direction, it is possible to reduce a situation that sprays of fuel injected from injectors may adhere to inner wall surfaces of intake passages, and it is possible to make the fuel supply to combustion chambers stable. Provided is a vertical engine including: a pair of intake passages (911a and 911b) which are arranged in an up and down direction with the interposition of a central axis of a cylinder (241) therebetween; a pair of intake valves (41L₁ and 41L₂) which open and close the pair of intake passages; and fuel injectors (70L₁ and 70L₂) which inject fuel to the pair of intake passages; wherein: the fuel injectors are arranged so that fuel injection directions by the fuel injectors can go not toward valve stems (411) of the intake valves provided in the upper and lower intake passages respectively but toward the backs of valve heads of the intake valves on a central axis (C1) side of the cylinder and the fuel injectors are disposed so that a central axis (FC2) of injection of the fuel injector into the lower intake passage can be closer to the central axis side of the cylinder than a central axis (CF1) of injection of the fuel injector into the upper intake passage.

5 Claims, 8 Drawing Sheets

(51) Int. Cl.
| | |
|---|---|
| *F02M 35/16* | (2006.01) |
| *F02M 61/14* | (2006.01) |
| *F02B 61/04* | (2006.01) |
| *F02B 75/22* | (2006.01) |
| *F02M 55/02* | (2006.01) |
| *F02M 35/108* | (2006.01) |
| *F02B 23/08* | (2006.01) |
| *F02M 69/04* | (2006.01) |
| *F02B 1/04* | (2006.01) |
| *F02M 35/10* | (2006.01) |
| *F02B 75/12* | (2006.01) |

(52) U.S. Cl.
CPC .... *F02M 35/108* (2013.01); *F02M 35/10072* (2013.01); *F02M 35/116* (2013.01); *F02M 35/16* (2013.01); *F02M 35/167* (2013.01); *F02M 55/025* (2013.01); *F02M 61/14* (2013.01); *F02M 69/044* (2013.01); *F02B 1/04* (2013.01); *F02B 2075/125* (2013.01); *F02M 35/10045* (2013.01)

(58) Field of Classification Search
USPC .................................................. 123/432, 470
See application file for complete search history.

(56) References Cited

U.S. PATENT DOCUMENTS

| | | | | |
|---|---|---|---|---|
| 7,913,665 | B2* | 3/2011 | Oomura | F02M 61/145 123/308 |
| 8,281,766 | B2* | 10/2012 | Tomiita | F02M 35/10177 123/432 |
| 2006/0144369 | A1* | 7/2006 | Takahashi | F01L 1/053 123/470 |
| 2009/0241905 | A1 | 10/2009 | Tomiita et al. | 123/470 |

* cited by examiner

VERTICAL ENGINE

TECHNICAL FIELD

The present invention relates to a vertical engine in which a crankshaft is disposed so as to extend in a substantially vertical direction.

BACKGROUND ART

In the background art, there has been known a fuel supply device of an engine provided with a plurality of intake valves and a plurality of fuel injectors (hereinafter referred to as "injectors") per cylinder (e.g. see Patent Literature 1). In the fuel supply device, the centers of distal end portions of a pair of injectors are disposed on the side of a central axis of the cylinder relatively to central axes of a corresponding pair of intake valves so that fuel can be injected toward the central axis of the cylinder. Thus, even in the case where sucked air flowing into a combustion chamber forms a flow toward the side of an inner circumferential wall (cylinder inner circumferential wall) forming the cylinder, it is possible to prevent spray of the fuel from being easily carried toward the cylinder inner circumferential wall so that it is possible to reduce adhesion of the fuel to the cylinder inner circumferential wall.

PRIOR ART DOCUMENT

Patent Literature

Patent Literature 1: JP-A-2007-309121

SUMMARY OF THE INVENTION

Problem to be Solved by the Invention

In an engine mounted in a motorcycle etc., a crankshaft is generally disposed to extend in a horizontal direction. When a plurality of intake valves and a plurality of injectors are provided as described above, the intake valves and the injectors are also disposed to be arranged side by side relatively to one another in the horizontal direction. On the other hand, in an engine mounted in an outboard motor, a crankshaft is generally disposed to extend in a vertical direction and each cylinder is disposed to extend in a horizontal direction. When a plurality of intake valves and a plurality of injectors are provided as described above, intake passages passing through the intake valves are disposed to be arranged side by side in an up/down direction relatively to a central axis of the cylinder.

A spray of fuel injected from each injector is affected by the gravity on the distal end side of its injection. Therefore, there may occur a situation that the spray of fuel may fall down below a central axis of injection by an injection nozzle of the injector and adhere to an inner wall surface of each intake passage under an intended position of the injection. The fuel adhering to the inner wall surface of the intake passage may turn into droplets to flow along the inner wall surface of the intake passage. Accordingly, it may take a long time for the fuel to arrive at a combustion chamber in comparison with mist fuel. As a result, the fuel supply to the combustion chamber may become so unstable that there can arise a problem such as a failure in idling or increase of hydrocarbon in exhaust gas.

In the fuel supply device described in Patent Literature 1, the central axis of injection of fuel by each injector is disposed not in accordance with a valve stem of an intake valve disposed in each intake passage but in accordance with the back of a valve head of the intake valve on the center side of the cylinder so that a spray of the fuel can be concentrated in the vicinity of a spark plug inside the combustion chamber. That is, the central axis of injection of fuel by the injector is disposed to be shifted from the valve stem of the intake valve in the horizontal direction. Therefore, even when the spray of the fuel injected from the injector falls down due to the influence of the gravity, the spray of the fuel can be prevented from making contact with the valve stem so that desired fuel supply to the combustion chamber can be performed.

On the other hand, in the case where the intake passages and the injectors are disposed to be arranged side by side in the up/down direction as in the engine for an outboard motor, a spray of fuel injected from each injector may gravitate due to the influence of the gravity. Thus, there may occur a situation that the spray of the fuel may make contact with the valve stem of each intake valve. In this case, there may occur a situation that the spray of the fuel may scatter due to the contact with the valve stem so as to adhere to the inner wall surface of the intake passage.

Here, consider a case where the centers of the distal end portions of a pair of injectors are disposed on the center side of the cylinder relatively to the valve stems of the intake valves disposed in the respective intake passages. For example, the injector provided in the upper intake passage is disposed under the valve stem of the intake valve. Therefore, even in the case where a spray of fuel injected from the injector is affected by the gravity, the spray of the fuel falls down in a direction leaving the valve stem. Accordingly, the spray of the fuel can be prevented from scattering due to its contact with the valve stem.

On the other hand, the injector provided in the lower intake passage is disposed above the valve stem of the intake valve. Therefore, even in the case in which a spray of fuel injected from the injector is affected by the gravity, the spray of the fuel falls down in a direction approaching the valve stem. Accordingly, there may occur a situation that the spray of the fuel may scatter due to its contact with the valve stem so as to adhere to the inner wall surface of the intake passage. As a result, the fuel supply to the combustion chamber may become unstable to thereby cause a problem such as a failure in idling or increase of hydrocarbon in exhaust gas.

The invention has been accomplished in consideration of the foregoing points. An object of the invention is to provide a vertical engine in which it is possible to reduce a situation that sprays of fuel injected from injectors may adhere to inner wall surfaces of intake passages and it is possible to make the fuel supply to a combustion chamber stable even in the case where a crankshaft extends in a substantially vertical direction.

Means for Solving the Problem

A vertical engine of the present invention comprises: a crankshaft which is arranged to extend in a substantially vertical direction; a cylinder and a cylinder head which are arranged to extend in a direction perpendicular to a central axis of the crankshaft; a pair of intake passages which supply combustion air to a combustion chamber of the cylinder head; a pair of intake valves which open and close the pair of intake passages; and fuel injectors which inject fuel into the pair of intake passages; wherein: the pair of intake passages are arranged in an up/down direction with the interposition of the central axis of the cylinder therebetween; and the fuel injectors are arranged so that fuel injection directions by the fuel injectors can go not toward valve stems of the intake valves provided in the upper and lower intake passages respectively but toward the backs of valve heads of the intake valves on the central axis side of the cylinder, and the fuel injectors are disposed so that a central axis of injection into the lower intake passage can be closer to the central axis side of the cylinder than a central axis of injection into the upper intake passage.

According to the configuration, the central axes of injection of the fuel from the fuel injectors are disposed on the central axis side of the cylinder relatively to the valve stems of the intake valves provided in the upper and lower intake passages, and the central axis of the injection into the lower intake passage is disposed to be closer to the central axis side of the cylinder than the central axis of the injection into the upper intake passage. Therefore, even in the case where a spray of the fuel injected from each of the fuel injectors falls down due to the influence of the gravity, it is possible to reduce a situation that the spray of the fuel may make contact with the valve stem in the lower intake passage. Thus, it is possible to reduce a situation that the spray of the fuel may scatter due to its contact with the valve stem and it is possible to reduce a situation that the spray of the fuel may adhere to the inner wall surface of the intake passage. As a result, even in the case where the crankshaft extends in the substantially vertical direction, it is possible to reduce a situation that a spray of the fuel injected from each of the injectors may adhere to the inner wall surface of each of the intake passages, and it is possible to make the fuel supply to the combustion chamber stable.

In the vertical engine, it is preferable that: one intake passage is divided into two by a branch portion to thereby form the pair of intake passages, and the fuel injectors are provided independently so that the fuel injectors can inject fuel not toward the branch portion but into the intake passages disposed on the combustion chamber side. According to the configuration, the fuel injectors are disposed independently in the pair of intake passages. Accordingly, it is possible to inject the fuel at angles suitable for the intake passages respectively so that it is possible to make the fuel supply to the combustion chamber further stable. In addition, since the fuel is injected not toward the branch portion but into the intake passages disposed on the combustion chamber side. Accordingly, it is possible to reduce a situation that the sprays of the fuel may adhere to wall surfaces of the branch port, and it is possible to make the fuel supply to the combustion chamber further stable.

For example, the vertical engine is constituted by a multiple cylinder engine in which a plurality of the cylinders and a plurality of the cylinder heads are disposed in an up/down direction; and a plurality of the fuel injectors disposed in the pair of intake passages are arranged in parallel with each other and one end portions of the fuel injectors are connected to a common delivery pipe. In this case, the plurality of fuel injectors disposed in the pair of intake passages communicating with the combustion chamber for each cylinder are arranged in parallel with one another. Accordingly, it is possible to assemble the plurality of fuel injectors at one and the same angle with respect to the delivery pipe. Accordingly, it is possible to simplify the assembling of the plurality of fuel injectors so that it is possible to suppress the increase in machining man-hour and assembling man-hour.

In the vertical engine, it may be that the vertical engine further comprises: a pair of cylinder blocks which are disposed in a V-shape with the crankshaft as the center; wherein: the fuel injectors are constituted by a pair of fuel injectors which inject fuel into the pair of intake passages; the pair of intake passages communicate with combustion chambers inside cylinder heads constituting the pair of cylinder blocks, and include intake ports opened in their inner side surfaces to which the pair of cylinder blocks are opposed, the pair of intake passages being disposed so that the intake passages can extend substantially in parallel with cylinder axes of the cylinder blocks to which the intake passages are opposed and can intersect with each other in an X-shape; and a branch portion which divides each of the intake passages into two is provided in each of the intake ports of the pair of intake passages and the pair of fuel injectors are disposed in regions surrounded by an intersection portion between the pair of intake passages and valve chambers of the cylinder heads and in positions in which the fuel injectors can inject the fuel not toward the branch portions but into the intake passages disposed on the sides of the combustion chambers.

According to the configuration, the pair of intake passages are disposed to intersect with each other in an X-shape and the pair of fuel injectors are disposed in the regions surrounded by the intersection portion and the valve chambers of the cylinder heads. Accordingly, it is possible to form the intake passages linearly without any bend so that it is possible to reduce intake resistance in the intake passages. In addition, it is possible to dispose the fuel injectors by use of the regions in the vicinities of the intake passages which are formed linearly so that it is possible to prevent interference between the fuel injectors and the intake passages. As a result, even in the case where the pair of cylinder blocks are disposed in a V-shape, it is possible to prevent interference between the fuel injectors and the intake passages and it is possible to improve intake efficiency of the intake passages.

In the vertical engine, it is preferable that: the intersection portion between the pair of intake passages is formed in a part of an intake manifold which connects the intake ports and intake pipes inside a surge tank to each other, and attachment portions for the pair of fuel injectors and fuel injection passages are formed in the vicinities of joint portions of the cylinder heads to the intake manifold. According to the configuration, the intersection portion between the pair of intake passages can be constituted by another component for the cylinder blocks etc. Thus, it is possible to manufacture the pair of intake passages intersecting with each other in an X-shape without requiring any complicated step, in comparison with the case where the intersection portion between the intake pipes is provided integrally with the cylinder heads etc. In addition, the attachment portions for the pair of fuel injectors and the fuel injection passages are formed in the vicinities of the joint portions of the cylinder heads to the intake manifold. Accordingly, it is possible to enhance the positional accuracy of the fuel injectors in comparison with the case where the fuel injectors are disposed in other members than the cylinder heads. Thus, it is possible to inject the fuel at desired positions in the combustion chamber, and it is possible to make the fuel supply to the combustion chamber stable.

Advantageous Effects of Invention

According to the vertical engine according to the invention, even in the case where the crankshaft extends in the substantially vertical direction, it is possible to reduce a situation that sprays of fuel injected from the injectors may adhere to the inner wall surfaces of the intake passages and it is possible to make the fuel supply to the combustion chamber stable.

EMBODIMENTS FOR CARRYING OUT THE INVENTION

An embodiment of the invention will be described below in detail with reference to the accompanying drawings. A case where a vertical engine (V-type engine) according to the embodiment is applied to an outboard motor will be described below for convenience of explanation. However, the subject to which the vertical engine according to the embodiment is applied is not limited to the outboard motor but may be changed suitably. For example, the vertical engine according to the embodiment may be also applied to a motorcycle, a lawn mower, etc.

In addition, in the description of the invention and the scope of Claims, the term "vertical engine" is referred to as an engine of a form in which a crankshaft driven in accordance with explosion of combustion air inside a combustion chamber is arranged in a substantially vertical direction to extract a motive force in the substantially vertical direction. Here, the term "substantially vertical direction" is not limited to a direction approximate to the vertical direction but may include the vertical direction.

Figure 1:
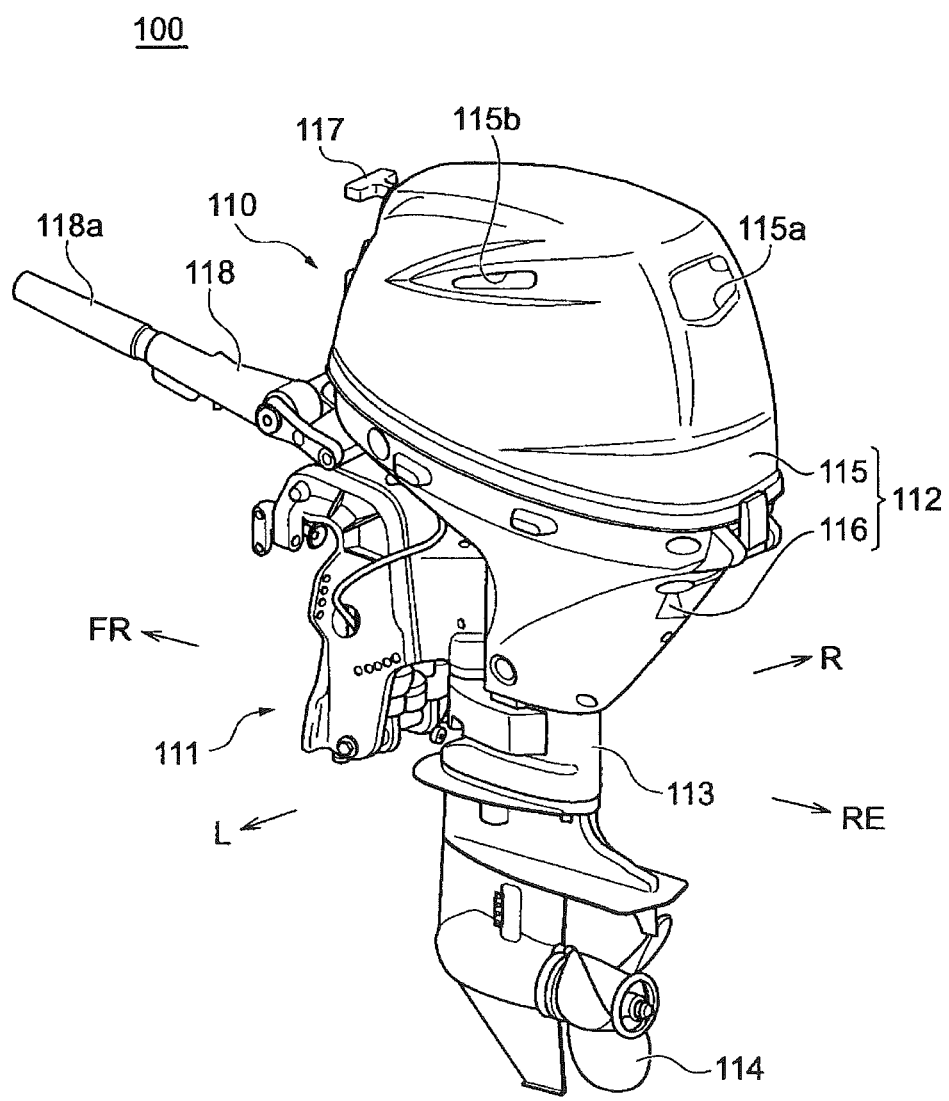
FIG. 1 An overall perspective view of an outboard motor to which a vertical engine according to an embodiment of the invention is applied.

First, a schematic configuration of the outboard motor to which the vertical engine according to the embodiment is applied will be described. FIG. 1 is an overall perspective view of the outboard motor to which the vertical engine according to the embodiment is applied. Incidentally, in the following drawings, for convenience of explanation, a front side of the outboard motor will be designated by an arrow FR; a rear side of the outboard motor, an arrow RE; a left side of the outboard motor, an arrow L; and a right side of the outboard motor, an arrow R.

As shown in FIG. 1, the outboard motor 100 according to the embodiment is constituted by an outboard motor main body 110, and a bracket device 111 for attaching the outboard motor main body 110 to a stern portion (not shown) of a hull. The outboard motor main body 110 has an engine cover 112 which is provided in an upper portion of the main body, and a body portion 113 which is provided under the engine cover 112. A propeller 114 is provided in the vicinity of a lower end portion of the body portion 113. The engine cover 112 is constituted by an upper cover 115 and a lower cover 116. The bracket device 111 is disposed on a front side of the lower cover 116 and the body portion 113.

On the whole the upper cover 115 has a shape opened in a lower side. On the other hand, on the whole the lower cover 116 has a shape opened in an upper side. When the upper cover 115 and the lower cover 116 are mated with each other, an engine room is formed inside the outboard motor main body 110. A vertical engine (hereinafter referred to as "engine" simply) 1 which will be described later (see FIG. 2) is received in the engine room. Incidentally, a not-shown seal member is disposed on a mating face between the upper cover 115 and the lower cover 116. On the whole the seal member has an annular shape to serve a function to prevent water such as seawater from entering through the mating face between the upper cover 115 and the lower cover 116.

A lever 117 for a recoil starter 23 which can start the engine 1 (see FIG. 2 and FIG. 3) is provided at the front of the upper cover 115 to protrude frontward from the outboard motor 100. When the lever 117 is pulled, the engine 1 is started. In addition, an intake port 115a for introducing combustion air for the engine 1 is provided at the rear of the upper cover 115. Further, an exhaust port 115b for discharging air inside the engine cover 112 to the outside is provided in the vicinity of an upper end portion of a left side surface of the upper cover 115.

A tiller handle 118 is provided in front of the lower cover 116 and above the bracket device 111 to protrude frontward from the outboard motor 100. The tiller handle 118 is configured so that the tiller handle 18 can be operated to swing the outboard motor main body 110 in an up/down direction and a left/right direction with the stern portion as a fulcrum. The bracket device 111 is fixed to the stern portion. A throttle grip 118a is attached to a distal end of the tiller handle 118. The throttle grip 118a is attached rotatably around the axis of the tiller handle 118. An opening degree of a throttle valve (not shown) is adjusted in accordance with a rotation amount of the throttle grip 118a. Thus, the speed or acceleration/deceleration of the hull can be controlled.

A crankshaft 22 which will be described later is disposed in the outboard motor main body 110 to extend in a vertical direction (see FIG. 4). A not-shown power conversion mechanism is provided in a lower end portion of the crankshaft 22. The engine 1 is connected to the propeller 114 through the crankshaft 22 and the power conversion mechanism. In the outboard motor 100, a driving force of the engine 1 is converted into a rotation force of the propeller 114 by the crankshaft 22 and the power conversion mechanism. Thus, a propelling force is obtained.

Figure 2:
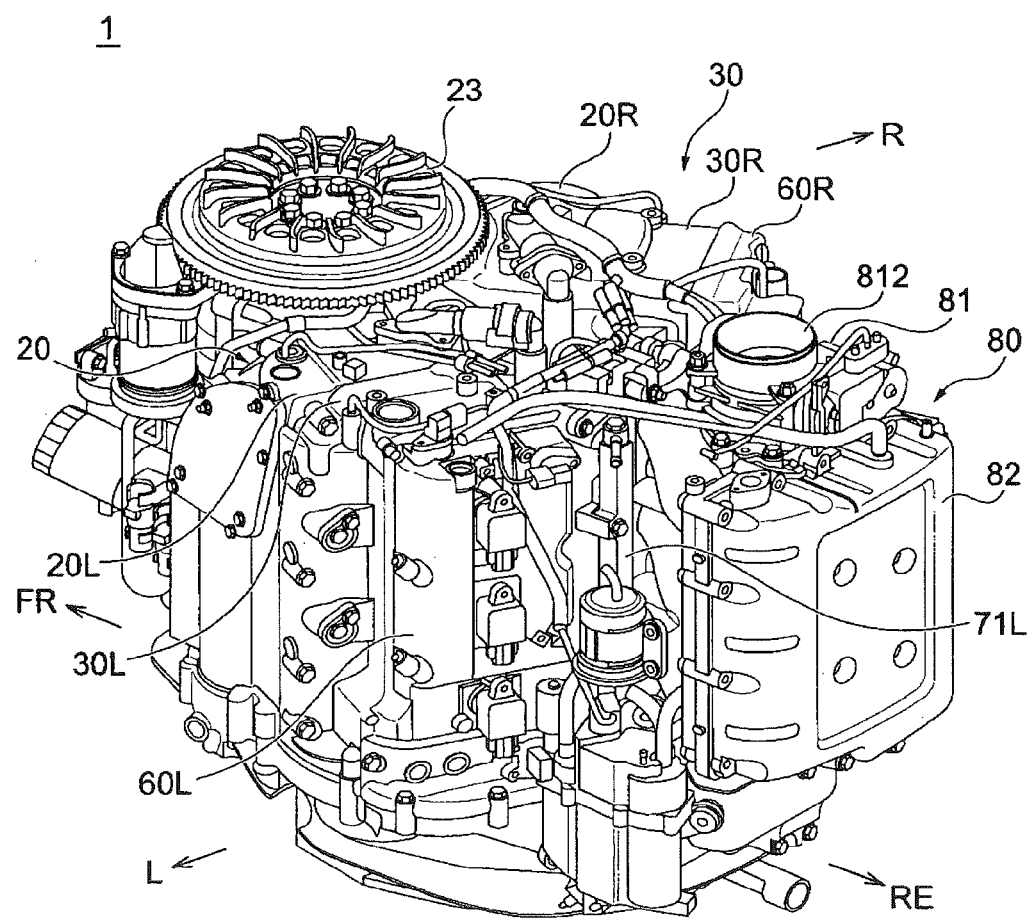
FIG. 2 A perspective view showing a schematic structure of the vertical engine according to the embodiment.
Figure 3:
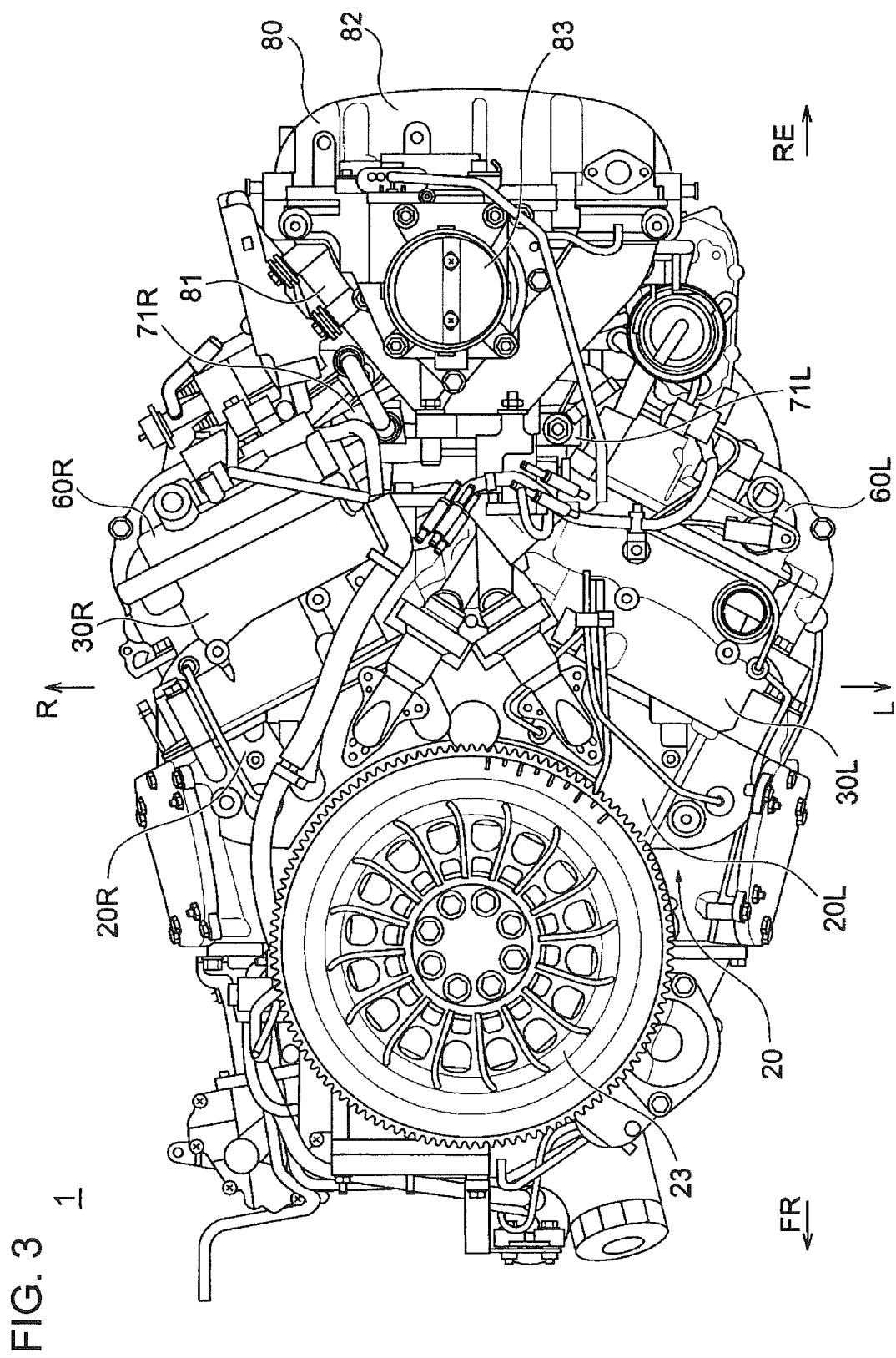
FIG. 3 A top view showing the schematic structure of the vertical engine according to the embodiment.

Next, the configuration of the engine 1 disposed inside the engine cover 112 (engine room) will be described with reference to FIGS. 2 to 4. FIG. 2 is a perspective view showing a schematic structure of the engine 1 according to the embodiment. FIG. 3 is a top view showing the schematic structure of the engine 1 according to the embodiment. FIG. 4 is a horizontal sectional view showing the schematic structure of the engine 1 according to the embodiment. Incidentally, the perspective view of the engine 1 seen from a rear side is shown in FIG. 2. For convenience of explanation, a throttle body 83 connected to a surge tank 80 which will be described later is omitted in FIG. 2.

Figure 4:
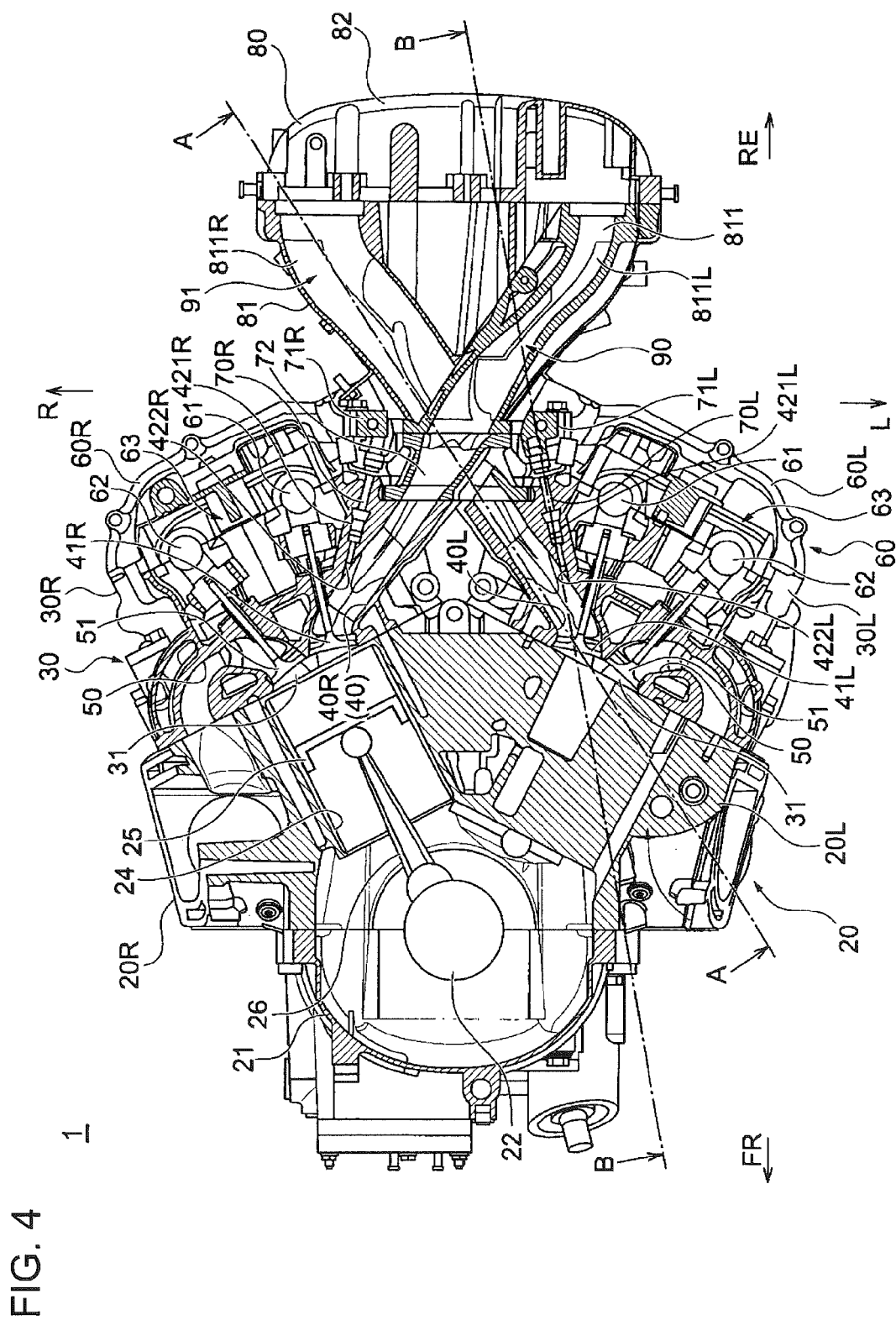
FIG. 4 A horizontal sectional view showing the schematic structure of the vertical engine according to the embodiment.

The engine 1 shown in FIGS. 2 to 4 is received in the engine cover 112 (engine room). As shown in FIGS. 2 to 4, a pair of left and right cylinder blocks 20 (20L and 20R) are placed in a V-shape in plan view in the engine 1 to thereby form a V-shape cylinder bank (V-bank) opened toward the rear side. For example, the engine 1 is constituted by a multiple cylinder engine in which each of the cylinder blocks 20 is arranged in the up/down direction. In the embodiment, assume that the engine 1 is constituted by a water-cooled four-cycle V-type six-cylinder engine.

As shown in FIG. 4, a crankcase 21 is disposed in a frontmost portion (bow side) of the engine 1. The cylinder blocks 20 are disposed at the rear of the crankcase 21. The crankshaft 22 is pivotally supported between the crankcase 21 and the cylinder blocks 20. The crankshaft 22 is disposed to extend in the substantially vertical direction. An upper end portion of the crankshaft 22 protrudes above the engine 1. The recoil starter 23 is provided in the protruding portion (see FIG. 2 and FIG. 3).

The cylinder blocks 20 have a left side bank portion 20L and a right side bank portion 20R. Cylinder heads 30 are provided at the rear of the cylinder blocks 20. The cylinder heads 30 are constituted by cylinder heads 30L and 30R corresponding to the left side bank portion 20L and the right side bank portion 20R. Three cylinders (cylinders) 24 are formed inside each of the left side bank portion 20L and the right side bank portion 20R (see FIG. 5). The cylinders 24 and the cylinder heads 30 are arranged along horizontal cylinder axes perpendicular to the central axis of the crankshaft 22. A piston 25 is inserted into each cylinder 24 slidably. The piston 25 is connected to the crankshaft 22 through a connecting rod 26.

Combustion chambers 31, intake ports 40 (40L and 40R) which communicate with the combustion chambers 31, and exhaust ports 50 are provided correspondingly to the respective cylinders 24 in the cylinder heads 30L and 30R. The cylinder heads 30L and 30R are covered with head covers 60L and 60R respectively. Intake cam shafts 61 and exhaust cam shafts 62 are pivotally supported to be rotatable inside cam chambers formed between the cylinder heads 30 (30L and 30R) and the head covers 60 (60L and 60R), respectively.

The intake ports 40 (40L and 40R) are disposed to be opened in inner side portions of the V-shape constituted by each cylinder bank. Each intake port 40L provided in the cylinder head 30L is provided to extend toward a right rear side of the engine 1. On the other hand, each intake port 40R provided in the cylinder head 30R is provided to extend toward a left rear side of the engine 1. In this case, the intake port 40L is disposed substantially in parallel with an extension direction of the right side bank portion 20R, and the intake port 40R is disposed substantially in parallel with an extension direction of the left side bank portion 20L. Communication portions of the intake ports 40 (40L and 40R) with the combustion chambers 31 are opened/closed by intake valves 41 (41L and 41R). Incidentally, opening/closing of the intake valves 41 is controlled by not-shown cams provided on the intake cam shafts 61.

The exhaust ports 50 are disposed in outer side portions of the V-shape constituted by each cylinder bank. The exhaust ports 50 are provided to be curved gently from outer side portions of the cylinder heads 30 toward the front side of the engine 1. Exhaust pipes (not shown) extending in the vertical direction are connected to front end portions of the exhaust ports 50. Communication portions of the exhaust ports 50 with the combustion chambers 31 are opened/closed by exhaust valves 51. Incidentally, opening/closing of the exhaust ports 51 is controlled by not-shown cams provided on the exhaust cam shafts 62.

Fuel injectors (hereinafter referred to as "injectors" simply) 70 for injecting fuel to the intake ports 40 are attached to the cylinder heads 30. The injectors 70 are constituted by injectors 70L which are attached to the cylinder head 30L and injectors 70R which are attached to the cylinder head 30R. Each injector 70L is disposed between the intake port 40L and the intake valve 41L in the cylinder head 30L. On the other hand, each injector 70R is disposed between the intake port 40R and the intake valve 41R in the cylinder head 30R.

More specifically, the injectors 70L and 70R are attached to attachment portions 421L and 421R formed in the cylinder heads 30. In the state in which the injectors 70L and 70R are attached to the attachment portions 421L and 421R, front end portions of the injectors 70L and 70R are provided to be exposed slightly in fuel injection passages 422L and 422R. The fuel injection passages 422L and 422R are formed in the intake ports 40L and 40R. On the other hand, rear end portions of the injectors 70L and 70R are connected to delivery pipes 71L and 71R extending in the vertical direction. These delivery pipes 71L and 71R function as pipes which convey fuel to be injected from the injectors 70L and 70R. These delivery pipes 71L and 71R are disposed on sides of joint portions between an intake manifold 72 and the surge tank 80. The intake manifold 72 will be described later.

The surge tank 80 is provided at the rear of a center portion of the engine 1 through the intake manifold 72 connected to the intake ports 40. The surge tank 80 is provided with a surge tank main body 81 and a cover member 82 which seals the surge tank main body 81. The inside of the surge tank main body 81 is hollow. A rear side end surface of the surge tank main body 81 is opened. A plurality of (six in the embodiment) intake pipes 811 are provided in the surge tank main body 81. Rear end portions of the intake pipes 811 are opened in the side of the cover member 82. In addition, an opening portion 812 to which the throttle body 83 is connected is provided in an upper surface of the surge tank main body 81 (see FIG. 2). Outside air taken in from the throttle body 83 enters through the rear end-side openings of the intake pipes 811 through a space inside the surge tank main body 81 and the cover member 82, and flows toward the front side.

The throttle body 83 is connected to a not-shown silencer arranged in an upper portion of the engine 1. The throttle body 83 takes in outside air introduced into the silencer. The surge tank 80 serves a function to temporarily reserve the outside air taken in from the throttle body 83 and equalize a supply amount of air (combustion air) to each of the cylinders 24. When the supply amount of combustion air is equalized by the surge tank 80, an excessive flow of the combustion air into any specific cylinder 24 can be suppressed.

The plurality of intake pipes 811 are constituted by cylindrical bodies each of which has one and the same shape, is formed into a circular shape in section and extends substantially linearly. These intake pipes 811 are connected to the cylinders 24 respectively through the intake ports 40 provided in the intake manifold 72 and the cylinder heads 30. More specifically, the plurality of intake pipes 811 have intake pipes 811R which are disposed on a right side of the engine 1 and intake pipes 811L which are disposed on a left side of the engine 1. The intake pipes 811R are disposed coaxially with the intake ports 40L with the interposition of the intake manifold 72 therebetween. On the other hand, the intake pipes 811L are disposed coaxially with the intake ports 40R with the interposition of the intake manifold 72 therebetween.

Intake passages are constituted by spaces formed inside the intake pipes 811, the intake manifold 72 and the intake ports 40. More specifically, each intake passage 90 for supplying combustion air to the combustion chamber 31 of the cylinder head 30R is constituted by a space formed inside the intake port 40R, the intake manifold 72 and the intake pipe 811R. On the other hand, each intake passage 91 for supplying combustion air to the combustion chamber 31 of the cylinder head 30L are constituted by a space formed inside the intake port 40L, the intake manifold 72 and the intake pipe 811L.

The pair of intake passages 90 and 91 are disposed to extend substantially in parallel with cylinder axes of the cylinder blocks 20L and 20R and intersect with each other in an X-shape. The intake passages. 90 and 91 are opposed to the cylinder blocks 20L and 20R respectively. The pair of injectors 70R and 70L are disposed in regions surrounded by the intersection portion between the intake passages 90 and 91 and valve chambers 63 of the cylinder heads 30. That is, the injector 70L is disposed in the region surrounded by the intersection portion between the intake passages 90 and 91 and the valve chamber 63 of the cylinder head 30L. On the other hand, the injector 70R is disposed in the region surrounded by the intersection portion between the intake passages 90 and 91 and the valve chamber 63 of the cylinder head 30R.

When the pair of intake passages 90 and 91 are disposed thus to intersect with each other in an X-shape, the intake passages 90 and 91 can be configured linearly. Accordingly, intake resistance in the intake passages 90 and 91 can be reduced. In addition, the injectors 70R and 70L can be disposed by use of the regions in the vicinities of the intake passages 90 and 91 which are formed linearly. Accordingly, interference between the injectors 70R and 70L and the intake passages 90 and 91 can be prevented. Therefore, even when the pair of left and right cylinder blocks 20R and 20L are disposed in a V-shape, interference between the injectors 70R and 70L and the intake passages 90 and 91 can be prevented and intake efficiency of the intake passages 90 and 91 can be improved.

In addition, the intersection portion between the pair of intake passages 90 and 91 is formed in a part of the intake manifold 72. Accordingly, the intersection portion between the pair of intake passages 90 and 91 can be constituted by the intake manifold 72 serving as another component for the cylinder blocks 20 etc. Thus, the pair of intake passages 90 and 91 intersecting with each other in an X-shape can be manufactured without requiring any complicated step, in comparison with the case where the intersection portion between the intake passages 90 and 91 is provided integrally with the cylinder heads 30 etc.

Further, the attachment portions 421L and 421R to which the injectors 70L and 70R are attached and the fuel injection passages 422L and 422R in which fuel is injected from the injectors 70L and 70R are formed in the vicinities of the joint portions of the cylinder heads 30 to the intake manifold 72. Therefore, positional accuracy of the injectors 70R and 70L can be enhanced in comparison with the case where the injectors 70R and 70L are disposed in other members than the cylinder heads 30. Thus, the fuel can be injected to desired positions in the combustion chambers 31 and the fuel supply to the combustion chambers 31 can be made stable.

Figure 5:
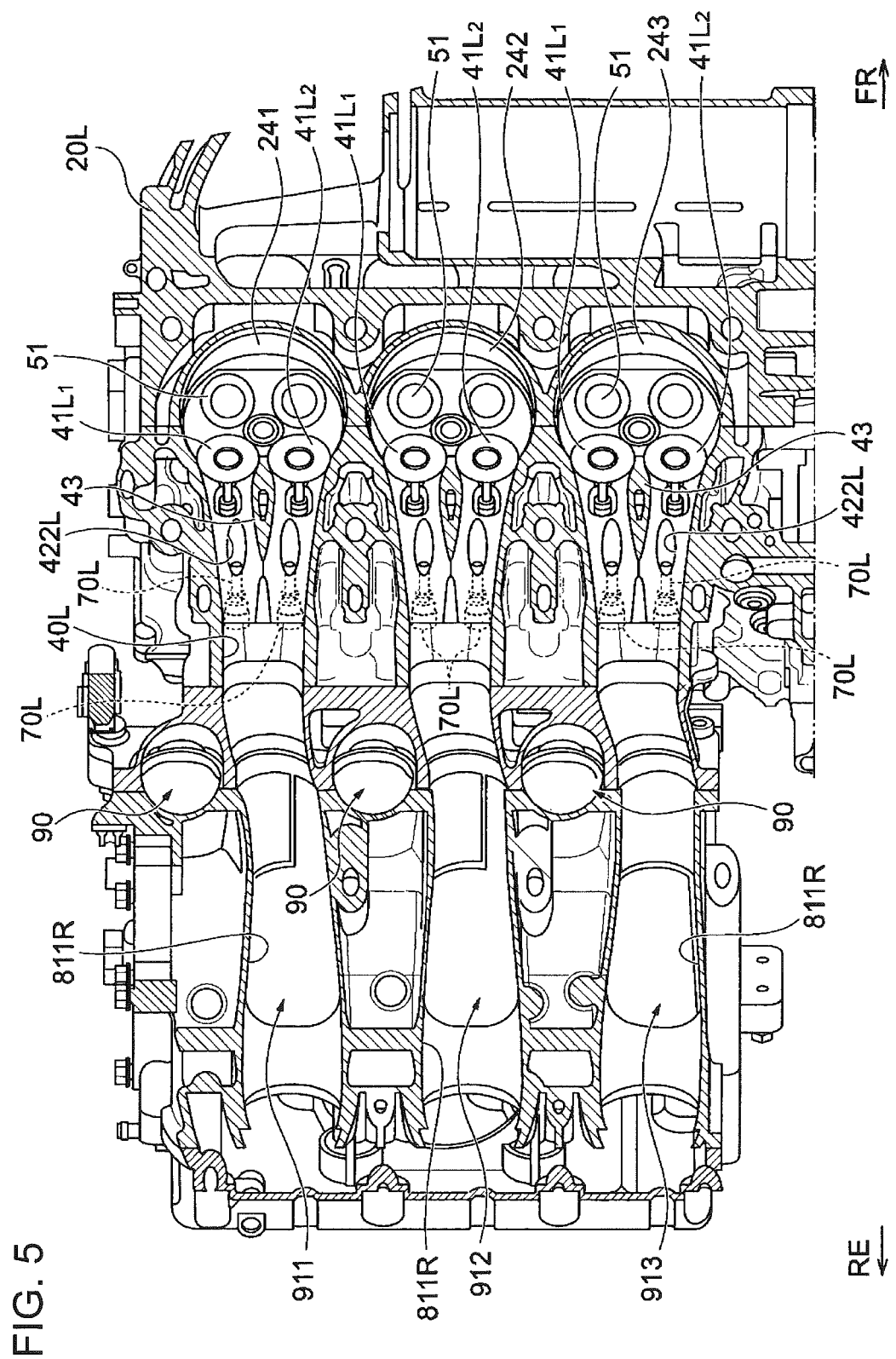
FIG. 5 A sectional view taken along a one-dot chain line A-A shown in FIG. 4.
Figure 6:
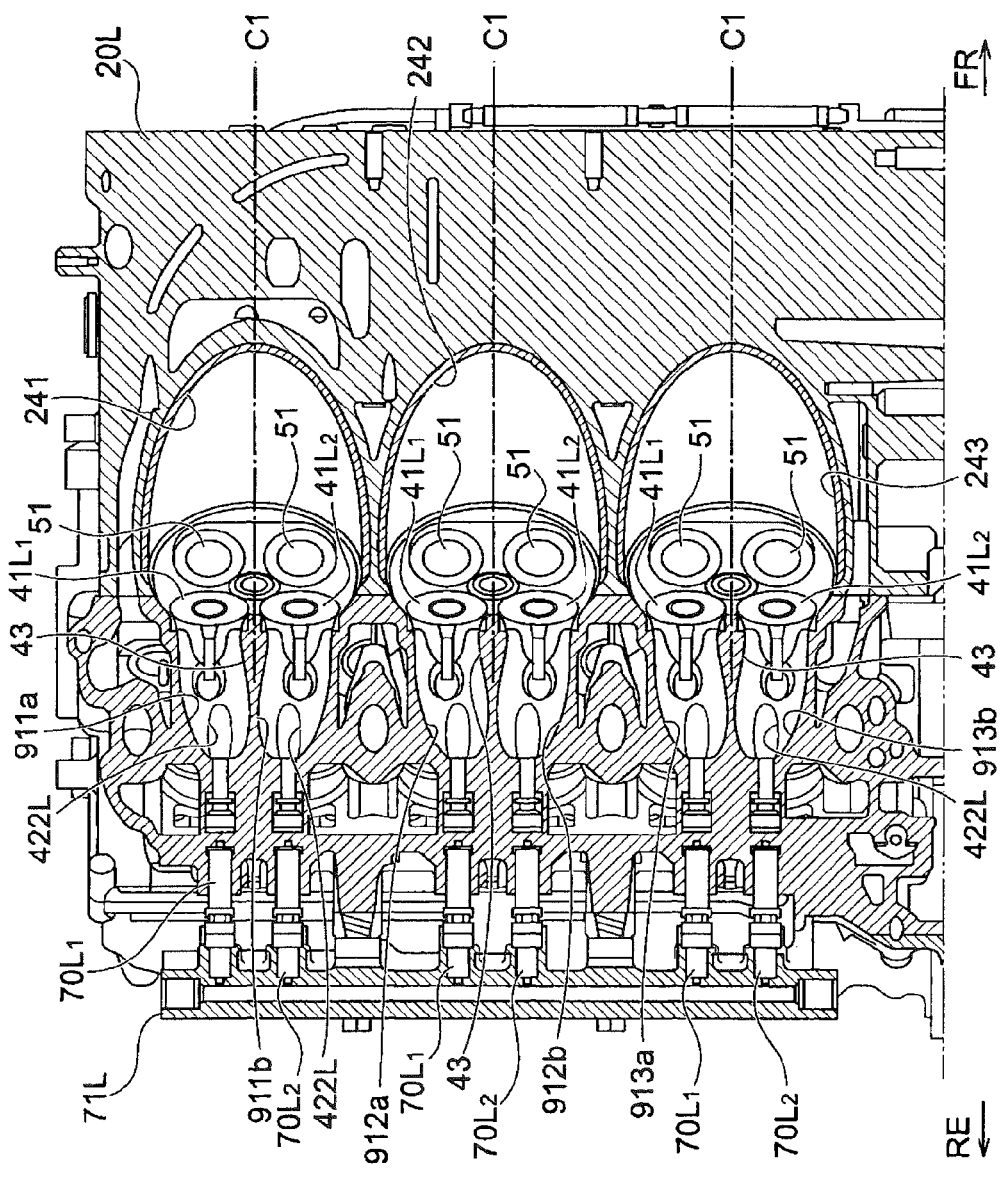
FIG. 6 A sectional view taken along a one-dot chain line B-B shown in FIG. 4.

The configuration of the intake passages 90 and 91 in the engine 1 according to the embodiment will be described below with reference to FIG. 5 and FIG. 6. FIG. 5 is a sectional view taken along a one-dot chain line A-A shown in FIG. 4. FIG. 6 is a sectional view taken along a one-dot chain line B-B shown in FIG. 4. Incidentally, the intake passage 90 and the intake passage 91 have a common configuration except their extension directions. The intake passage 91 will be described below by way of example, while description about the intake passage 90 will be omitted. Incidentally, in FIG. 6, central axes of the respective cylinders 241 to 243 are designated by "C1".

As shown in FIG. 5, the three cylinders 241 to 243 are disposed in the up/down direction in the left side bank portion 20L. The intake passages 91 are constituted by three intake passages 911, 912 and 913 connected to the three cylinders 24. The intake passages 911 to 913 have a common configuration except their arrangements in the up/down direction. As to the configuration of each of the intake passages 911 to 913, the intake passage 911 will be described below by way of example while description about the intake passages 912 and 913 will be omitted appropriately.

A branch portion 43 for dividing each intake passage 91 into two is provided substantially in the vertical-direction center of each intake port 40L constituting the intake passage 91. As shown in FIG. 6, a downstream side end portion (right side end portion shown in FIG. 5 and FIG. 6) of the intake passage 911 is divided into a pair of intake passages 911a and 911b by the branch portion 43. The pair of intake passages 911a and 911b are arranged in the up/down direction with the interposition of the central axis C1 of the cylinder 241 therebetween. Similarly, the intake passage 912 (913) is divided into a pair of intake passages 912a and 912b (913a and 913b) by another branch portion 43.

Intake valves 41L are disposed so that those can open and close the pair of intake passages 911a and 911b (912a and 912b or 913a and 913b). More specifically, the intake valves 41L are constituted by a pair of intake valves $41L_1$ and $41L_2$ which are disposed in the up/down direction for each of the cylinders 241 to 243. The intake valves $41L_1$ and $41L_2$ are disposed to be arranged side by side in the up/down direction with the interposition of the central axis C1 of the cylinder 241 (242 or 243) therebetween.

The injectors 70L are disposed in positions in which fuel can be injected into the pair of intake passages 911a and 911b (912a and 912b or 913a and 913b). The injectors 70L are constituted by a pair of injectors $70L_1$ and $70L_2$ independent correspondingly to the pair of intake passages 911a and 911b (912a and 912b or 913a and 913b). The injectors $70L_1$ and $70L_2$ are disposed to be arranged side by side in the up/down direction with the interposition of the central axis C1 of the cylinder 241 (242 or 243) therebetween.

As shown in FIG. 6, the injectors $70L_1$ and $70L_2$ disposed in the pair of intake passages 911a and 911b (912a and 912b or 913a and 913b) are arranged in parallel with each other. Rear end portions of the injectors $70L_1$ and $70L_2$ are connected to the common delivery pipe 71L. Thus, the plurality of injectors $70L_1$ and $70L_2$ are assembled at one and the same angle with respect to the delivery pipe 71L. Accordingly, it is possible to simplify assembling of the plurality of injectors $70L_1$ and $70L_2$ and it is possible to suppress the increase in machining man-hour and assembling man-hour.

Figure 7:
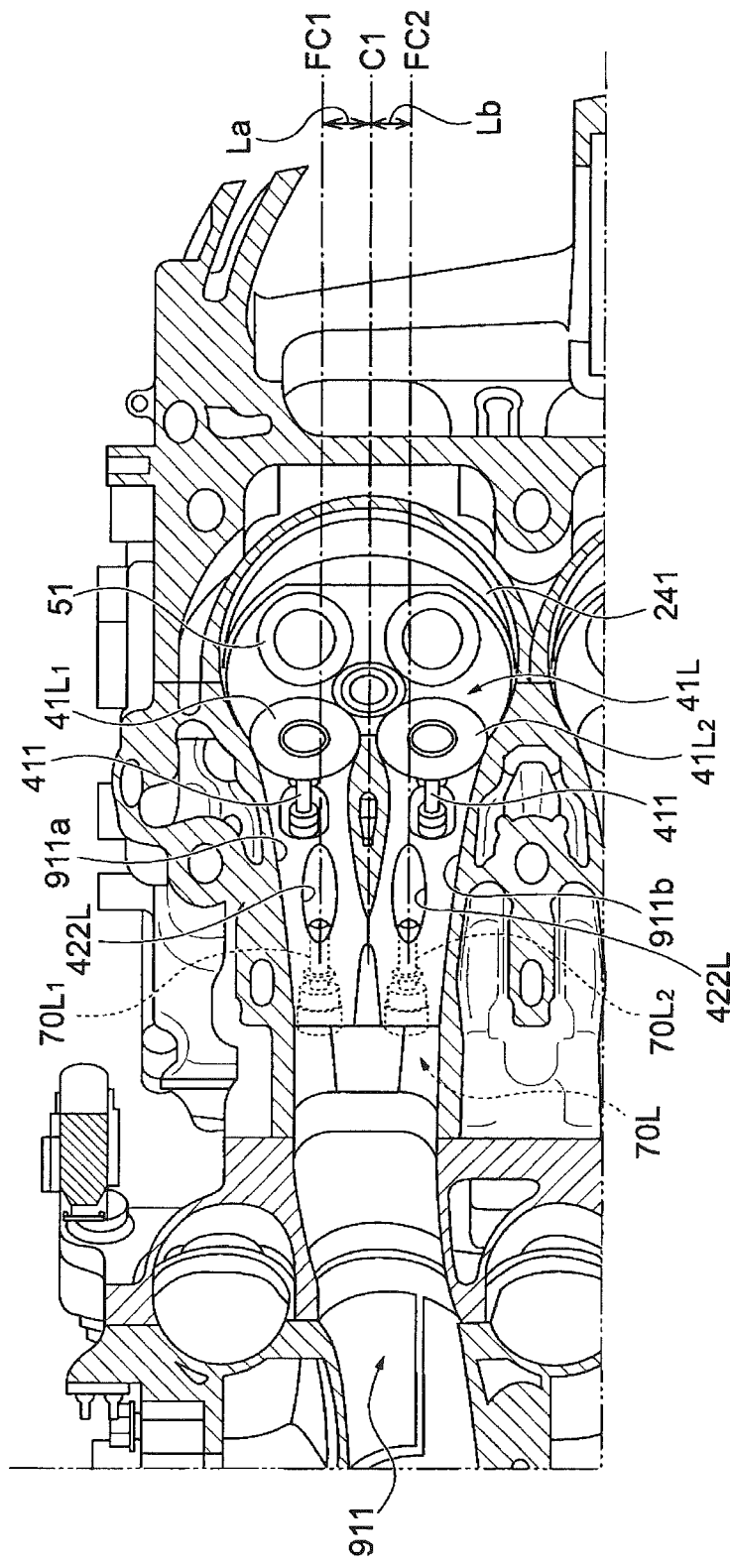
FIG. 7 An enlarged view of the periphery of an uppermost intake passage shown in FIG. 5.

Here, a fuel injection direction of each injector 70 provided in the engine 1 according to the embodiment will be described. FIG. 7 is an enlarged view of the periphery of the uppermost intake passage 911 shown in FIG. 5. Although a fuel injection direction in the intake passage 911 will be described here by way of example, fuel injection directions in the other intake passages including the intake passages 912 and 913 are also similar. Incidentally, central axes (hereinafter referred to as "injection central axes") of sprays of the fuel injected by the injectors $70L_1$ and $70L_2$ are designated by "FC1" and "FC2" respectively in FIG. 7. In addition, the central axis of the cylinder 241 is designated by "C1" in the same manner as in FIG. 6.

As shown in FIG. 7, each injector 70L is disposed so that a direction of injection of the fuel by the injector 70L can go not toward a valve stem 411 of the intake valve 41L but toward the back of a valve head of the intake valve 41L on the central axis C1 side of the cylinder 241. Specifically, the injection central axis FC1 of the fuel by the injector $70L_1$ disposed on an upper side is disposed under the valve stem 411 of the intake valve $41L_1$, and the injection central axis FC2 of the fuel by the injector $70L_2$ disposed on a lower side is disposed above the valve stem 411 of the intake valve $41L_2$.

In addition, in each injector 70L, the injection central axis FC2 of the fuel by the injector $70L_2$ disposed on the lower side is disposed to be closer to the central axis C1 side of the cylinder 241 than the injection central axis FC1 of the fuel by the injector $70L_1$ disposed on the upper side. More specifically, a length Lb between the central axis C1 of the cylinder 241 and the injection central axis FC2 of the injector $70L_2$ is set to be smaller than a length La between the central axis C1 of the cylinder 241 and the injection central axis FC1 of the injector $70L_1$. Thus, a distance between the injection central axis FC2 of the injector $70L_2$ and the valve stem 411 of the intake valve $41L_2$ is secured to be larger than a distance between the injection central axis FC1 of the injector $70L_1$ and the valve stem 411 of the intake valve $41L_1$.

Operation during fuel injection in the engine 1 having the aforementioned configuration will be described below. When the throttle grip 118a of the tiller handle 118 in the engine 1 is operated and rotated by a boat operator, an opening degree of the throttle valve inside the throttle body 83 is adjusted. An opening/closing timing of each intake valve 41 and a fuel injection timing to be performed by each injector 70 are controlled in accordance with the opening degree of the throttle valve.

For example, fuel is supplied from the injectors $70L_1$ and $70L_2$ to the pair of intake passages 911a and 911b into which the intake passage 911 is divided and which are disposed in the up/down direction (see FIG. 7). Here, the fuel is injected from the injectors $70L_1$ and $70L_2$ not toward the valve stems 411 of the intake valves 41L but toward the backs of the valve heads of the intake valves 41L on the central axis C1 side of the cylinder 241. Particularly, the fuel is injected from the injector $70L_2$ in a state in which the injection central axis FC2 of the fuel from the injector $70L_2$ is located closer to the central axis C1 side of the cylinder 241 than the injection central axis FC1 of the fuel from the injector $70L_1$.

When the fuel injection direction by each injector 70L is disposed thus on the central axis C1 side of the cylinder 241 relatively to the valve stem 411 of the intake valve 41L, it is possible to reduce a situation that a spray of the fuel injected from the injector 70L may scatter due to contact of the fuel spray with the valve stem 411. In addition, the distance to an inner circumferential wall of the cylinder 241 can be secured. Thus, it is possible to reduce a situation that the fuel may adhere to the inner circumferential wall of the cylinder 241 due to suction of combustion air into the combustion chamber 31.

Particularly, the injection central axis FC2 of the fuel by the injector $70L_2$ disposed on the lower side is disposed to be closer to the central axis C1 side of the cylinder 241 than the injection central axis FC1 of the fuel by the injector $70L_1$ disposed on the upper side. Thus, the distance between the injection central axis FC2 and the valve stem 411 of the intake valve 41L can be secured in comparison with the distance between the injection central axis FC1 and the valve stem 411 of the intake valve 41L. Thus, it is possible to reduce a situation that a spray of the fuel injected from the injector $70L_2$ and falling down due to the influence of the gravity may scatter due to contact of the fuel spray with the valve stem 411.

As described above, the fuel injection directions by the injectors $70L_1$ and $70L_2$ are set in the engine 1 according to the embodiment. Accordingly, even when a spray of the fuel falls down due to the influence of the gravity, it is possible to reduce a situation that the spray of the fuel may make contact with the valve stem 411 in the intake passage 911b on the lower side. Thus, it is possible to reduce a situation that the spray of the fuel may scatter due to contact of the fuel spray with the valve stem 411 and it is possible to reduce a situation that the spray of the fuel may adhere to the inner wall surface of the intake passage 911. As a result, even when the crankshaft 22 extends in the vertical direction, it is possible to reduce a situation that a spray of the fuel injected from the injector 70 may adhere to the inner wall surface of the intake passage 911, and it is possible to make the fuel supply to the combustion chamber 31 stable.

Particularly, in the engine 1 according to the embodiment, one intake passage 911 is divided into two by the branch portion 43 to thereby form the pair of intake passages 911a and 911b, and the injectors $70L_1$ and $70L_2$ are provided independently so that the injectors $70L_1$ and $70L_2$ can inject the fuel not toward the branch portion 43 but into the intake passages 911a and 911b disposed on the combustion chamber 31 side. Thus, the fuel can be injected at angles suitable for the intake passages 911a and 911b respectively so that combustion efficiency in the combustion chamber 31 can be enhanced. Moreover, the fuel is injected not toward the branch portion 43 but into the intake passages 911a and 911b disposed on the combustion chamber 31 side. Accordingly, it is possible to reduce a situation that sprays of the fuel may adhere to wall surfaces of the branch portion 43, and it is possible to make the fuel supply to the combustion chamber 31 further stable.

Incidentally, the invention is not limited to each of the aforementioned embodiments but may be carried out with various changes made thereon. In the aforementioned embodiment, the sizes, shapes, etc. illustrated in the accompanying drawings are not limited to the aforementioned ones but may be changed suitably within the scope in which advantageous effects of the invention can be attained. In addition thereto, the invention can be carried out with any other suitable change made thereon without departing from the scope of the object of the invention.

For example, the aforementioned embodiment has been described in the case where the engine 1 is constituted by a multiple cylinder engine in which each of the cylinder blocks 20 is arranged in the up/down direction. However, the configuration of the engine 1 is not limited thereto but may be changed suitably. For example, the engine may be constituted by a single cylinder engine or a V-type two-cylinder engine in which each cylinder block 20 is not arranged in an up/down direction.

In addition, the aforementioned embodiment has been shown in the case where one intake passage 911 is divided into two by the branch portion 43 to thereby form the pair of intake passages 911a and 911b supplying combustion air to the combustion chamber 31. However, the configuration of the pair of intake passages supplying combustion air to the combustion chamber 31 is not limited thereto but may be changed suitably. For example, configuration may be made not to divide one intake passage but to provide a pair of intake passages supplying combustion air to the combustion chamber 31 in advance.

Further, the aforementioned embodiment has been shown in the case where the injectors $70L_1$ and $70L_2$ are provided independently and respectively in the pair of intake passages 911a and 911b supplying combustion air to the combustion chamber 31. However, the configuration of the injectors 70 injecting the fuel into the pair of intake passages 911a and 911b is not limited thereto but may be changed suitably. For example, a single injector 70 which can inject fuel to the pair of intake passages 911a and 911b may be provided.

Figure 8:
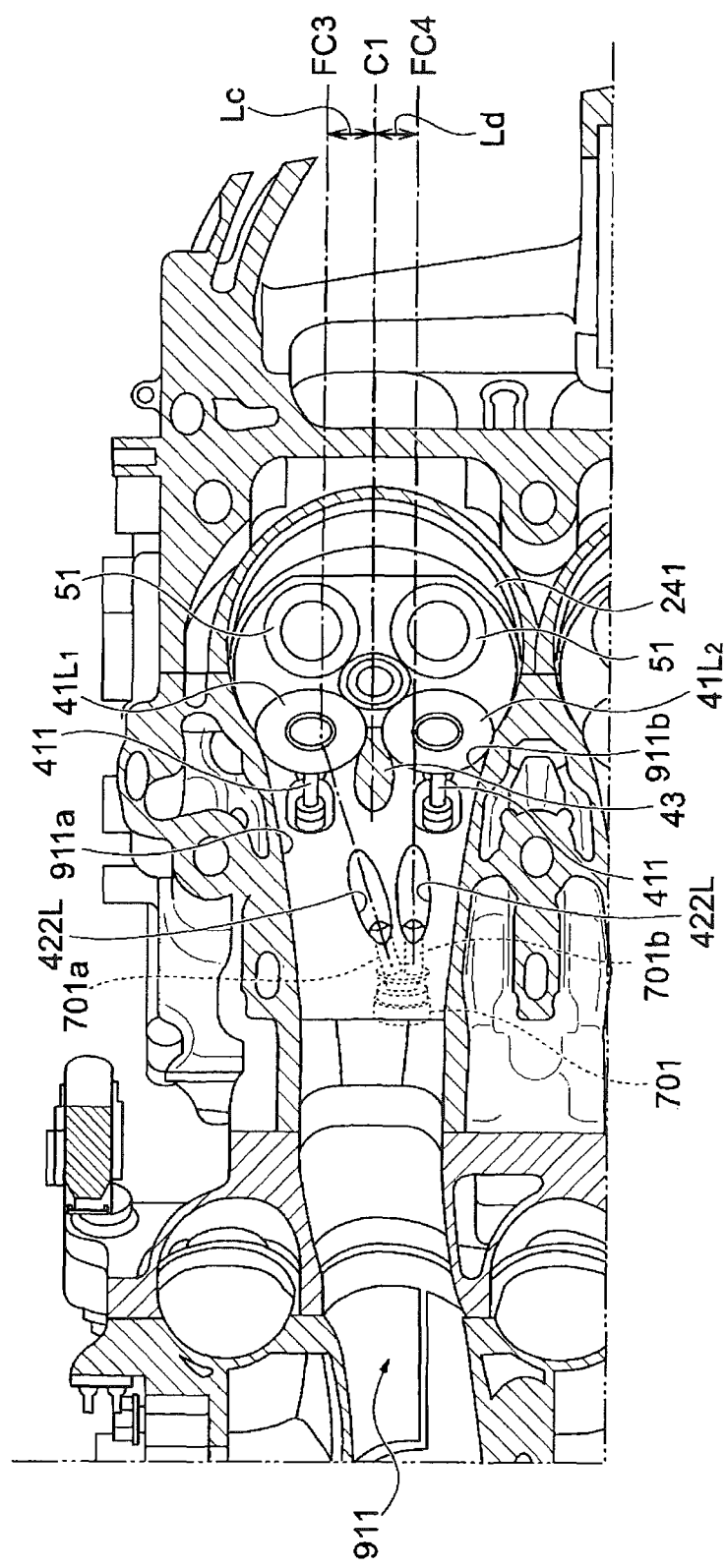
FIG. 8 An enlarged view of the periphery of an uppermost intake passage of a vertical engine according to a modification of the embodiment.

FIG. 8 is an enlarged view of the periphery of an uppermost intake passage of a vertical engine according to a modification of the embodiment. Incidentally, in FIG. 8, common constituent elements to those constituent elements shown in FIG. 7 will be referred to by one and the same numerals or signs respectively for convenience of explanation, and description of those constituent elements will be omitted. An enlarged view of the periphery of an intake passage 911 is shown in FIG. 8, similarly to that in FIG. 7. In addition, in FIG. 8, positions in which central axes (injection central axes) of sprays of fuel injected from injection nozzles 701a and 701b of an injector 701 which will be described later make contact with intake valves $41L_1$ and $41L_2$ will be designated by "FC3" and "FC4" respectively.

The single injector 701 injecting fuel into a pair of intake passages 911a and 911b is provided in the vertical engine shown in FIG. 8. The injector 701 has a pair of injection nozzles 701a and 701b which can inject the fuel into the intake passages 911a and 911b respectively. The injector 701 is disposed so that fuel injection directions from the injection nozzles 701a and 701b can go not toward valve stems 411 of the intake valves $41L_1$ and $41L_2$ but toward the backs of valve heads of the intake valves $41L_1$ and $41L_2$ on a central axis C1 side of a cylinder 241.

Particularly, the injector 701 is disposed so that the injection central axis FC4 of the fuel by the injection nozzle 701b disposed on a lower side can be closer to the central axis C1 side of the cylinder 241 than the injection central axis FC3 of the fuel by the injection nozzle 701a disposed on an upper side. More specifically, a length Ld between the central axis C1 of the cylinder 241 and the injection central axis FC4 of the injection nozzle 701b is set to be smaller than a length Lc between the central axis C1 of the cylinder 241 and the injection central axis FC3 of the injection nozzle 701a. Thus, a distance between the injection center axis FC4 of the injection nozzle 701b and the valve stem 411 of the intake valve $40L_2$ is secured to be larger than a distance between the injection center axis FC3 of the injection nozzle 701a and the valve stem 411 of the intake valve $41L_1$.

The fuel injection directions by the injection nozzles 701a and 701b are set in the injector 701 shown in FIG. 8. Thus, even when a spray of the fuel falls down due to the influence of the gravity, it is still possible to reduce a situation that the spray of the fuel may make contact with the valve stem 411 in the intake passage 911b on the lower side in a similar manner to that in the aforementioned embodiment. Thus, it is possible to suppress a situation that the spray of the fuel may scatter due to its contact with the valve stem 411, and it is possible to reduce a situation that the spray of the fuel may adhere to an inner wall surface of the intake passage 911. As a result, even in the case where a crankshaft 22 extends in a vertical direction, it is possible to reduce a situation that the spray of the fuel injected from the injector 70 may adhere to the inner wall surface of the intake passage 911, and it is possible to make the fuel supply to the combustion chamber 31 stable.

The aforementioned embodiment has been described in the case where the intersection portion between the pair of intake passages 90 and 91 is formed in a part of the intake manifold 72. However, the member where the intersection portion between the pair of intake passages 90 and 91 is formed is not limited to the intake manifold 72 but may be changed suitably. For example, the intersection portion between the pair of intake passages 90 and 91 may be formed in parts of the cylinder heads 30.

Further, the aforementioned embodiment has been described in the case where the attachment portions 421L and 421R for the pair of injectors 70L and 70R and the fuel injection passages 422L and 422R are formed in the vicinities of the joint portions of the cylinder heads 30 to the intake manifold 72. However, the members where the attachment portions 421L and 421R for the pair of the injectors 70L and 70R and the fuel injection passages 422L and 422R are formed are not limited to the cylinder heads 30 but may be changed suitably. For example, the members may be formed in parts of the intake manifold 72.

INDUSTRIAL APPLICABILITY

As described above, the invention has the following effect. That is, even in the case where the crankshaft extends in the substantially vertical direction, the invention can reduce a situation that sprays of the fuel injected from the injectors may adhere to the inner wall surfaces of the intake passages so that the invention can make the fuel supply to the combustion chambers stable. For example, the invention is useful for a vertical engine which is mounted in an outboard motor etc.

The present application is based on a Japanese Patent Application No. 2014-099401 which was filed on May 13, 2014 and a Japanese Patent Application No. 2014-099610 which was filed on May 13, 2014. The contents are all included here in advance.

The invention claimed is:

1. A vertical engine comprising: a crankshaft which is arranged to extend in a substantially vertical direction; a cylinder and a cylinder head which are arranged to extend in a direction perpendicular to a central axis of the crankshaft; a pair of intake passages which supply combustion air to a combustion chamber of the cylinder head; a pair of intake valves which open and close the pair of intake passages; and fuel injectors which inject fuel into the pair of intake passages; wherein:
   the pair of intake passages are arranged in an up and down direction with interposition of a central axis of the cylinder therebetween; and
   the fuel injectors are arranged so that fuel injection directions by the fuel injectors go not toward valve stems of the intake valves provided in the upper and lower intake passages respectively but toward the backs of valve heads of the intake valves on the central axis side of the cylinder, and the fuel injectors are disposed so that a central axis of injection into the lower intake passage is closer to the central axis side of the cylinder than a central axis of injection into the upper intake passage.

2. The vertical engine according to claim 1, wherein:
   one intake passage is divided into two by a branch portion to thereby form the pair of intake passages, and the fuel injectors are provided independently so that the fuel injectors can inject fuel not toward the branch portion but into the intake passages disposed on the combustion chamber side.

3. The vertical engine according to claim 2, wherein:

the vertical engine is constituted by a multiple cylinder engine in which a plurality of the cylinders and a plurality of the cylinder heads are disposed in an up and down direction; and a plurality of the fuel injectors disposed in the pair of intake passages are arranged in parallel with each other and one end portions of the fuel injectors are connected to a common delivery pipe.

4. The vertical engine according to claim 1, further comprising:

a pair of cylinder blocks which are disposed in a V-shape with the crankshaft as the center; wherein:

the fuel injectors are constituted by a pair of fuel injectors which inject fuel into the pair of intake passages;

the pair of intake passages communicate with combustion chambers inside cylinder heads constituting the pair of cylinder blocks, and include intake ports opened in their inner side surfaces to which the pair of cylinder blocks are opposed, the pair of intake passages being disposed so that the intake passages extend substantially in parallel with cylinder axes of the cylinder blocks to which the intake passages are opposed and intersect with each other in an X-shape; and a branch portion which divides each of the intake passages into two is provided in each of the intake ports of the pair of intake passages and the pair of fuel injectors are disposed in regions surrounded by an intersection portion between the pair of intake passages and valve chambers of the cylinder heads and in positions in which the fuel injectors can inject the fuel not toward the branch portions but into the intake passages disposed on the sides of the combustion chambers.

5. The vertical engine according to claim 4, wherein:

the intersection portion between the pair of intake passages is formed in a part of an intake manifold which connects the intake ports and intake pipes inside a surge tank to each other, and attachment portions for the pair of fuel injectors and fuel injection passages are formed in the vicinities of joint portions of the cylinder heads to the intake manifold.

\* \* \* \* \*